Patented May 11, 1943

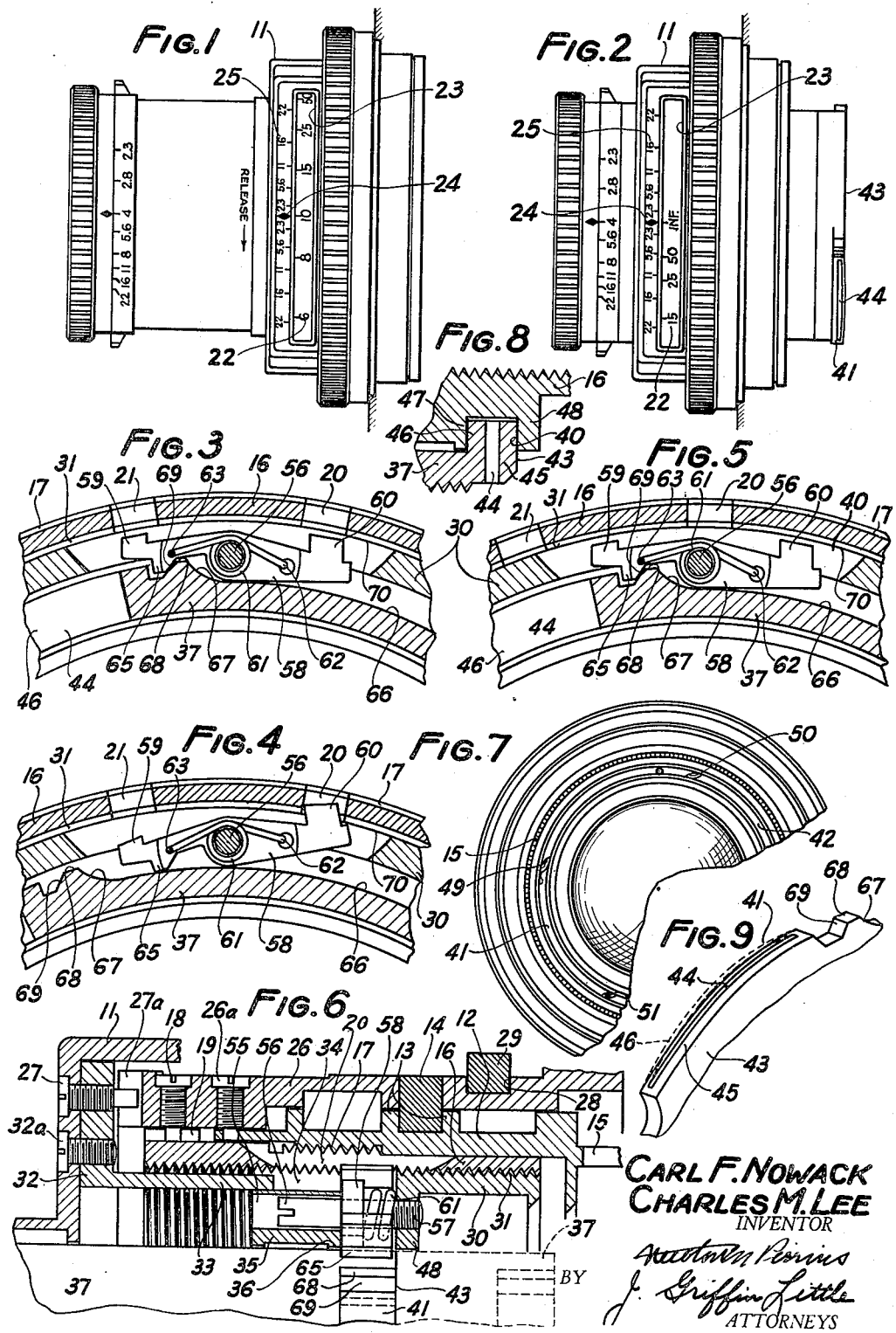

2,319,083

UNITED STATES PATENT OFFICE 2,319,083

LENS MOUNT

Carl F. Nowack and Charles M. Lee, Rochester, N. Y., assignors to Eastman Kodak Company, Rochester, N. Y., a corporation of New Jersey Application June 7, 1941, Serial No. 397,130

17 Claims. (Cl. 95—44)

The present invention relates to lens mounts, and more particularly to mounts of the collapsible or retractable types.

One object of the invention is the provision of a lens mount of this type which is provided with a lens barrel slidably arranged in the mount and movable to and from an operative position therein, and when in said operative positions may be releasably connected to the focusing mechanism.

Another object of the invention is the provision of an arrangement, in a lens mount of the class described, in which the lens barrel can be connected to or disconnected from the focusing mechanism only when the latter is adjusted to a predetermined position.

A further object of the invention is the provision of an arrangement by which the focusing mehanism is locked in said predetermined position when the lens barrel is disconnected therefrom.

A still further object of the invention is the provision of an arrangement in which the movement of the focusing mechanism from the predetermined position, with the lens barrel connected thereto, positively locks the lens barrel to the mechanism so that it cannot be disconnected therefrom; but the return of the focusing mechanism to the predetermined position permits the barrel to be disconnected from the focusing mechanism and simultaneously locks the latter in said predetermined position.

To these and other ends, the invention resides in certain improvements and combinations of parts, all as will be hereinafter more fully described, the novel features being pointed out in the claims at the end of the specification.

In the drawing:

Fig. 1 is a view of a lens mount of the collapsible or retractable type, showing the lens barrel in the forward or operative position in which it is operatively connected to the focusing mechanism so as to be actuated thereby to focus the mount;

Fig. 2 is a view similar to Fig. 1, but showing the lens barrel disconnected from the focusing mechanism and moved to its retracted or collapsed position, in which position the focusing mechanism is locked against adjustment;

Fig. 3 is a transverse sectional view through a portion of the lens mount but on a larger scale than Figs. 1 and 2, showing the relation of the lens barrel and the focusing mechanism at the time the barrel is connected to the focusing mechanism; and the latter is unlocked or released but is still in the predetermined position of adjustment;

Fig. 4 is a view similar to Fig. 3, but showing the relation of the parts when the lens barrel is disconnected from the focusing mechanism, and the latter is locked in a predetermined position of adjustment;

Fig. 5 is a view similar to Figs. 3 and 4 but showing still another position of a lens barrel and the focusing mechanism and in which the lens barrel is connected to the focusing mechanism, as in Fig. 3, but the latter is moved from its predetermined position to positively lock the barrel to the mechanism to prevent the disconnection therefrom;

Fig. 6 is a longitudinal view through the mount illustrated in Fig. 1, with parts in section and parts in elevation, showing the arrangement for releasably connecting the lens barrel to the focusing mechanism so that actuation of the latter will serve to move the lens barrel for focusing;

Fig. 7 is a partial rear view of the lens mount, showing the relation of the parts, and the bayonet lock connection for releasably connecting the lens barrel to the focusing mechanism;

Fig. 8 is a sectional view through the bayonet lock connection which releasably holds the lens barrel in operative relation with the focusing mechanism, showing the arrangement by which the desired frictional fit is secured; and Fig. 9 is a perspective view of a portion of the lens barrel showing one of the split bayonet locking lug and the actuating cam and holding shoulder on the lens barrel for holding the locking lever or latch out of locking relation with the focusing mechanism.

Similar reference numerals throughout the various views indicate the same parts.

The lens mount of the present invention comprises, broadly, an outer housing or casing 11 which is adapted to be secured to the front of the camera, in any suitable and well known manner. This casing has mounted therein, an annular drive ring 12 formed with spaced radial tongues or lugs 13 between which a key 14 of an annular sleeve or cam ring 26 extends. The latter is provided with a peripheral groove or slot 28 adapted to receive a second key 29 found on the casing 11 to retain or hold the sleeve 26 against axial movement relative to the casing 11. The rear end of the drive ring 12 has formed thereon a toothed clutch member 15 which is operatively connected with an actuating member, not shown, carried by the camera body so that movement of the actuating member serves to rotate the drive ring 12. A pin 26a is threaded into the sleeve 26 and extends into a registering opening in the drive ring 12, see Fig. 6, so that rotation of the latter also serves to rotate the sleeve 26 as a unit therewith, the keys 14 and 29, however, holding the sleeve 26 and ring 12 against axial movement, as will be apparent from an inspection of Fig. 6.

An annular focusing ring 16 is positioned within and is concentric with the drive ring 12, and is connected thereto by means of the thread 17. A second threaded pin 18 is carried by the sleeve 26 and projects into an axial slot 19 formed on the outer periphery of the focusing ring 16 so that the latter will rotate as a unit with sleeve 26 when the latter is, in turn, rotated with the drive ring 12. The thread 17 serves to retain the focusing ring 16 against axial movement relative to the drive ring 12. The sleeve 26, the drive ring 12, and the focusing ring 16 thus rotate as a unit and are held against axial movement by reason of the keys 14 and 29 and the thread 17. These three members thus constitute, in effect, a single unit which is rotatable but non-axially movable in the casing 11. A pin 27 carried by the casing 11 projects into the path of a limiting lug 27a on the sleeve 26 to limit the turning or rotative movement of said unit.

In order that the position of this unit may be readily ascertained by the operator, the sleeve 26 is provided with a focusing scale 22 which is viewable through an elongated slot or sight opening 23 formed in the casing 11. This movable focusing scale is adapted to cooperate with a fixed pointer 24 formed on the outer surface of the casing 11, as clearly shown in Figs. 1 and 2. The casing 11 also has formed thereon, adjacent the opening 23, a depth of focus scale 25 arranged to cooperate with the movable focusing scale 22 to indicate the depth of focus for the various adjustments of the focusing scale. The focusing ring 16 has formed therein a pair of apertures or recesses 20 and 21 arranged in the manner shown in Figs. 3, 4 and 5, and to be later more fully described.

An annular lock tube 30 is positioned within and is concentric with the focusing ring 16, and is connected thereto by a threaded connection 31. A key 32 is fixed to the casing 11, by a screw 32a and has an end 33 thereof extending into an axially extending slot 34 formed on the outer periphery of the lock tube 30 to hold the latter against rotation. By means of this arrangement, the unitary rotation of the sleeve 26 and the drive and focusing rings 12 and 16 will, through the threading connection 31, non-rotatably move the lock tube 30 axially of the mount, as will be apparent. The sleeve 26 and the drive and focusing rings 12 and 16 thus constitute, in effect, a rotatable but non-axially movable member or unit, while the lock tube 30 comprises an axially movable but not rotatable member. As the sleeve 26, the drive ring 12, the focusing ring 16, and the lock tube 30, all move or are actuated during the focusing operation, and are, at all times, operatively connected, these members may be broadly considered as a focusing mechanism to which a lens barrel, to be later described may be detachably connected.

The lock tube 30 is also provided with an inwardly projecting annular boss or ring 35 the inner surface 36 of which is of the shape best shown in Fig. 6 and is adapted to provide a support or bearing for a lens tube or barrel 37 which is telescopically positioned within and slidable axially and rotatably relative the lock tube 30. The lens barrel 37 carries the various lenses, not shown, and is freely movable outwardly relative to the lock tube to an operative position, as shown in Fig. 1, in which position the barrel may be releasably connected to the lock tube, and hence the focusing mechanism, in a manner to be later described, so that the actuation of the focusing mechanism serves to move the lens barrel axially of the mount for focusing. On the other hand, the lens barrel may be disconnected from the lock tube 30, and hence the focusing mechanism, and slid rearwardly relative to the lock tube to a collapsed or a retracted position, as shown in Fig. 2. Thus the lens barrel is slidable relative to the focusing mechanism to and from an operative position, and when in said operative position may be releasably connected to the focusing mechanism, as will be later more fully described.

In order to releasably connect the lens barrel 37 to the lock tube 30, the boss 35 of the latter is formed with a peripherally arranged open end slot 40 arranged to rotatably receive radially extending lugs 41 and 42 formed on the lens barrel 37 adjacent the rear end 43 thereof. Each of the lugs 41 and 42 is of the shape best shown in Fig. 9, and is formed with a longitudinally extending slot or cut 44 which extends substantially the full length of the lug, as shown in Fig. 9. After the cuts 44 are formed, a screw-driver or other similar tool may be positioned in the slots and turned to spring or bow the lugs, as shown in dotted lines of Fig. 9, so as to provide slightly flexible portions 45 and 46 adapted to yieldably engage the opposite side walls 47 and 48 of the slot 40, as will be apparent from an inspection of Fig. 8. In order that the lugs 41 and 42 may be inserted in the slot 40, the wall 48 thereof has diametrically arranged portions 49 and 50 thereof cut out, or removed. These portions are unequal in length and are the same size as the lugs 41 and 42 respectively, which are also unequal in length so that the barrel 37 may be connected in the lock tube 30 only in one position.

In order to connect the barrel 37 with the lock tube 30, the barrel is first slid axially from the inoperative position, shown in Fig. 2, to the operative position shown in Fig. 1. The barrel is then rotated relative of the lock tube to bring the lugs 41 and 42 into registry with the cut-away portions 49 and 50. As each lug is of a size to slide through only one of the cut-away portions, the barrel member must be rotated to bring the proper lug into registry with the proper cut-away portion, thereupon, the barrel is moved forwardly so that the lugs will pass through the cut-away portions and into the slot 40. Now by rotating the barrel relative to the lock tube, the lugs 41 and 42 will be moved out of registry with the cut-away portions 49 and 50 and behind the wall 48 to retain the lugs 41 and 42 in the slot 40, as shown in Fig. 8. The lugs 41 and 42 and the slot 40, with the cut-away portions 49 and 50, thus constitute a bayonet-lock connection by which the lens barrel may be releasably or detachably secured to the lock tube 30, and hence the focusing mechanism.

When the barrel is to be disconnected, it is rotated in the opposite direction to again bring the lugs 41 and 42 into registry with the cut-out portions 49 and 50, at which time the lug 41 engages a stop pin 51 positioned in the slot 40 to limit the reverse turning of the barrel relative to the lock tube. The barrel is then slid axially to move the lugs 41 and 42 out through the cutaway portions 49 and 50 to detach or disconnect the barrel from the lock tube. The detached barrel may then be slid to its inoperative position shown in Fig. 2. Thus the barrel 37 may be slid axially of the lock tube 30, and hence the focusing mechanism, from its inoperative position shown in Fig. 2 to the operative position shown in Fig. 1. In this operative position, the lens barrel may be releasably connected to the focusing mechanism through the lock tube 30, as will be apparent from an inspection of Fig. 6. When so connected to the focusing mechanism, the flexible members 45 and 46 of the lugs 41 and 42 yieldably engage the sides 47 and 48 of the slot 40 to provide the desired fit between the parts and to also take up any possible play which might be present. Rotation of the drive ring 12 will rotate the sleeve 26 and the focusing ring 16 as a unit therewith, and will non-rotatably move the lock tube 30 and the lens barrel 37 axially, as a unit for focusing, as is apparent.

The present invention also provides an arrangement by which the lens barrel may be connected to or disconnected from the lock tube 30, and hence the focusing mechanism, only when the latter is adjusted to a predetermined position, preferably infinity. When the focusing mechanism is so adjusted, the lens barrel may be readily and easily connected to or disconnected from the focusing mechanism by means of the above-described bayonet-lock connection. When however, the lens barrel is disconnected, the focusing ring 16 is locked to thereby positively lock the focusing mechanism in a predetermined position, infinity, so that the mechanism cannot be adjusted. In addition, the connecting of the lens barrel to the focusing mechanism serves automatically to unlock the latter so that it may be adjusted from the infinity position. Such adjustment then serves to lock the barrel in position so that it cannot be disconnected from the focusing mechanism until the latter is again returned to its predetermined position of adjustment, preferably infinity.

To secure these results, the boss 35 of the lock tube 30 is formed with an axially extending opening 55 adapted to receive a pin 56 threadedly seated at 57 in the wall 48, see Fig. 6. This pin 57 has pivotally mounted thereon a lever 58 the ends of which are formed with locking lugs 59 and 60, the purpose of which will be hereinafter more fully described. A spring 61 is wrapped around the pin 56 and has one end secured to the lever 58 at 62, and the other end 63 anchored to the lock tube. This spring normally tends to rotate the lever in a counter-clockwise direction, as viewed in Figs. 3, 4 and 5. When the focusing mechanism is adjusted to infinity, the predetermined position of adjustment, the lugs 59 and 60 of the lever 58 registered with recesses or openings 20 and 21 formed in the focusing ring 16, as clearly illustrated in Figs. 3 and 4.

As pointed out above, when the focusing mechanism is adjusted to infinity, the lens barrel may be disconnected from the lock tube. Fig. 4 shows the relative position of the parts when the lens barrel is so disconnected. When in this position, the spring 61 rocks the lever 58 in a counter-clockwise direction to bring an actuating or holding lug 65 into engagement with the outer surface 66 of the lens barrel. Such rocking of the lever 58 simultaneously moves the lug 60 into the aperture 20 of the focusing ring 16, see Fig. 4, to lock the mechanism at infinity, or the predetermined position of adjustment. Thus when the lens barrel is disconnected from the focusing mechanism, the latter is locked and held in a predetermined position of adjustment. While in the preferred embodiment, this predetermined position is at infinity, it is apparent that any other point of adjustment may be utilized without departing from the present invention.

When, however, the lens barrel 37 is to be connected to the focusing mechanism, the barrel is first moved to the position shown in Fig. 1 and then rotated relative to the lock tube 30 in a direction opposite that indicated by the arrow in Fig. 1, from the position shown in Fig. 4 to that shown in Fig. 3. During the rotating movement of the lens barrel, a radial cam 67 positioned on the surface 66 of the barrel engages the actuating lug 65 to rock the lever 58 in a clockwise direction to move the lug 60 out of the aperture 20 to unlock the focusing mechanism, as it apparent from inspection of Fig. 3. To permit this rocking movement of the lever, the opposite lug 59 moves upwardly into the registering recess 21 in the focusing ring 16. Substantially simultaneous with the unlocking of the focusing ring, and hence the focusing mechanism, the lug 65 rides over a ridge 68 formed on the lens barrel at the end of the cam 67 and drops behind a holding shoulder 69 to retain the lever 58 in the position shown in Fig. 3 in which the focusing mechanism is unlocked. Thus when the lens barrel is connected to the focusing mechanism, the lever 58 is moved to unlock the focusing ring, and hence the focusing mechanism to free the latter, and is held in engagement with the holding shoulder 69 on the lens barrel by the spring 61.

When the lens barrel 37 is thus connected to the lock tube 30, the unitary rotation of the sleeve 26, the drive ring 12, and the focusing ring 16 non-rotatably moves the lens barrel and lock tube axially to focus the mount. Such rotation of the cam sleeve and the drive and focusing rings will, however, move the focusing mechanism from its predetermined or infinity position of adjustment and will also position the apertures 20 and 21 out of registry with the lugs 59 and 60 of the lever 58 as clearly illustrated in Fig. 5. Referring now to this figure, it is apparent that in order to now disengage the lens barrel from the lock tube, the lug 65 must ride up over the ridge 68. However, any attempt to rotate the lens barrel in the direction shown by the arrows, Fig. 1, will immediately bring the lug 59 into engagement with the inner surface 70 of the focusing ring 16 as it apparent from an inspection of Fig. 5. The surface 70 is positioned close to the lug 59 and will be engaged by the latter before the lug 65 is moved away from the holding shoulder 69 and over the ridge 68. The surface 70 thus constitutes a blocking section or portion which serves to retain the lug 65 in engagement with the shoulder 69 to lock the lens barrel 37 so that it cannot be disengaged from the focusing mechanism when the latter is moved away from its predetermined position of adjustment. The ridge 68, in turn, holds the lever 58 in such a position that the lug 60 will not engage in the aperture 20 to lock the focusing ring until the focusing mechanism is again adjusted to infinity and the lens barrel has been disconnected, as shown in Fig. 4. Thus the adjustment of the focusing mechanism from its predetermined position of adjustment, after the lens barrel is connected, serves to lock the lens barrel in operative relation with the focusing mechanism.

However, upon returning the focusing mechanism to its predetermined position, as shown in Fig. 3, the apertures 21 and 20 are again brought into registry with the lugs 59 and 60 respectively. At this time, the lens barrel may be rotated in the direction of the arrow, Fig. 1, to disconnect the lens barrel from the lock tube. During such disconnection, the lug 65 rides over the ridge 68 and down along the cam 67 onto the surface 66 of the lens barrel, see Fig. 4. Such movement enables the spring 61 to rock the lever 58 and move the lug 60 into the opening 20 to lock the focusing mechanism in its infinity position.

It is thus apparent from the above description, that the lens barrel may be moved axially from an inoperative to an operative position, and when in the latter position may be detachably secured to the focusing mechanism of the mount by means of a bayonet-lock connection. The connecting or disconnecting of the lens barrel, is possible, however, only when the focusing mechanism is adjusted to its predetermined position, preferably infinity, and the mechanism is locked in this position when the barrel is disconnected. On the other hand, when the barrel is connected to the focusing mechanism, the latter is automatically unlocked so that it may be moved from the predetermined positions of adjustment. Such movement then serves to lock the lens barrel to the focusing mechanism so as to prevent any disconnecting therefrom until the focusing mechanism is again returned to the infinity position.

While one embodiment of the invention has been disclosed, it is to be understood that the inventive idea may be carried out in a number of ways. This application is therefore not to be limited to the precise details described, but is intended to cover all variations and modifications thereof falling within the scope of the appended claims.

We claim:

1. In a lens mount, the combination with a focusing mechanism carried by said mount, of a lens barrel telescopically arranged in said mount and slidable axially therein from an inoperative to an operative position, means for releasably connecting said barrel to said mechanism when said barrel is moved to its operative position so that said mechanism may move said barrel for focusing, means including a radially movable lug on said mechanism adapted to engage a portion of said lens barrel independently of said connecting means, and means on said mechanism positioned adjacent said lug to prevent movement thereof for retaining said second means in engagement with said portion to lock said barrel in its operative position.

2. In a lens mount, the combination with a focusing mechanism carried by said mount, of a lens barrel telescopically arranged in said mount and slidable axially therein from an inoperative to an operative position, means for releasably connecting said barrel to said mechanism when said barrel is moved to its operative position so that said mechanism may move said barrel for focusing, means on said mechanism adapted to engage a portion of said lens barrel independently of said connecting means, and a blocking section on said mechanism arranged to overlie said second means to prevent the disconnection thereof from said portion to lock said barrel in its operative position.

3. In a lens mount, the combination with a focusing mechanism carried by said mount, of a lens barrel telescopically arranged in said mount and slidable axially therein from an inoperative to an operative position, means for releasably connecting said barrel to said mechanism when said barrel is moved to its operative position so that said mechanism may move said barrel for focusing, a pivoted lever carried by said mount and movable into engagement with a portion of said barrel upon the engagement of the latter with said mechanism, and means on said mechanism adapted to retain said lever in engagement with said portion to lock said barrel in its operative position.

4. In a lens mount, the combination with a focusing mechanism carried by said mount and adapted to be moved to and from a predetermined position of adjustment, of a lens barrel telescopically arranged in said mount and slidable axially therein from an inoperative to an operative position, means for releasably connecting said barrel to said mechanism when the barrel is moved to its operative position so that said mechanism may be effective to move said barrel for focusing, means including a radially movable lug on said mechanism independent of said connecting means and adapted to engage a shoulder of said barrel only when said mechanism is adjusted to said predetermined position, and blocking means on said mechanism movable into the path of said lug for preventing radial movement thereof for disengaging said lug from said shoulder when said mechanism is moved from said predetermined position but permitting such disengagement when said mechanism is moved to said predetermined position to allow said barrel to be disconnected from said mechanism and moved to its inoperative position.

5. In a lens mount, the combination with a focusing mechanism carried by said mount, of a lens barrel telescopically arranged in said mount and slidable axially therein from an inoperative to an operative position, means for releasably connecting said barrel to said mechanism when said barrel is moved to its operative position so that said mechanism may move said barrel for focusing, a lever pivotally mounted on said mechanism and having a lug thereon adapted to engage a locking portion on said barrel, the engagement of said connecting means serving also to move said lug into engagement with said locking portion, and means on said mechanism movable to one position to retain said lug in engagement with said portion to lock said barrel to said mechanism but movable to another position to permit the release of said lug from said portion to allow said barrel to be disconnected from said mechanism.

6. In a lens mount, the combination with a focusing mechanism carried by said mount and adapted to be moved to and from a predetermined position of adjustment, of a lens barrel telescopically arranged in said mount and slidable axially therein from an inoperative to an operative position, means for releasably connecting said barrel to said mechanism when the barrel is moved to its operative position so that said mechanism may be effective to move said barrel for focusing, a pivoted lever carried by said mechanism, a locking portion on said barrel, a cam on said barrel adjacent said locking portion, said cam serving to move said lever into engagement with said locking portion substantially simultaneously with the engaging of said connecting means, and a blocking portion on said mechanism movable to block said lever when said mechanism is moved from said predetermined position to prevent both the engagement of said lever with or the disengagement from said locking portion but movable to an inoperative position when said mechanism is moved to said predetermined position to free said lever to permit the movement thereof away from said locking portion and the disengagement of said connecting means to disconnect said barrel from said mechanism.

7. In a lens mount, the combination with a rotatable but non-axially movable focusing ring on said mount, of a lock tube threadedly connected to the focusing ring so that rotation of the latter will non-rotatably move said tube axially of said mount, a lens barrel telescopically positioned in said lock tube and axially slidable therein from an inoperative to an operative position, a bayonet lock connection for releasably engaging said barrel to said tube by a relative rotation so as to non-rotatable move axially as a unit therewith to focus said barrel upon adjustment of said focusing ring, said ring being movable to and from a predetermined position of adjustment, a lever pivotally mounted on said lock tube, a lug carried by said lever, a spring engaging said lever to retain said lug in engagement with said barrel, a locking portion projecting radially from said barrel, a cam on the periphery of said barrel adjacent said locking portion and adapted to move said lug into engagement with said locking portion at the completion of the engagement of said bayonet connection, said ring being formed with a recess arranged to be positioned in registry with said lug when said ring is moved to said predetermined position to permit the engagement of said lug with or the disengagement thereof from said locking portion, and a blocking surface-portion on said ring movable into registry with said lug when said ring is moved from said predetermined position to lock said lug in engagement with said locking portion to prevent the disconnection of said barrel from said tube.

8. In a lens mount, the combination with a focusing mechanism carried by said mount, of a lens barrel telescopically arranged in said mount and adapted to be moved to and from an operative position, means for releasably connecting said barrel to said mechanism when said barrel is in said operative position, means carried by and movable with said mechanism and having a locking portion adapted to be moved into locking engagement with said mechanism to prevent the adjustment thereof, a holding portion on said barrel adapted to engage said means to hold said locking portion out of locking engagement with said mechanism when said barrel is connected to said mechanism, and means for automatically moving said portion into locking engagement with said mechanism upon moving of said holding portion away from said second means and said barrel is disconnected from said mechanism.

9. In a lens mount, the combination with a focusing mechanism carried by said mount, of a lens barrel telescopically arranged in said mount and adapted to be moved to and from an operative position, means for releasably connecting said barrel to said mechanism when said barrel is in said operative position, a lever pivotally mounted on said mechanism, a lug on said lever adapted to be moved into locking engagement with said mechanism to lock the latter against adjustment, a holding portion projecting radially from said barrel and adapted to engage said lever to hold said lug out of engagement with said mechanism, the disengagement of said barrel from said mechanism serving to move said holding portion out of supporting relation with said lever, and means for automatically moving said lug into locking engagement with said mechanism upon disconnecting of said barrel from said mechanism.

10. In a lens mount, the combination with a focusing mechanism carried by said mount and movable to and from a predetermined position of adjustment, of a lens barrel telescopically arranged in said mechanism and movable therein to and from an operative position relative thereto, means for releasably connecting said barrel to said mechanism when said barrel is moved to said operative position, a lever pivotally mounted substantially at its midpoint on said mechanism and formed with lugs on the ends thereof, said mechanism having a portion thereof formed with a recess adapted to register with one of said lugs when the mechanism is moved to said predetermined position and said barrel is disconnected, a spring for moving one of said lugs into said recess to lock said mechanism in said predetermined position, and means on said barrel adapted upon connecting said barrel to said mechanism to engage said other lug to pivot said lever to move said one lug out of said recess to unlock said mechanism to permit the latter to be moved from said predetermined position.

11. In a lens mount, the combination with a rotatable but non-axially movable focusing ring on said mount, of a lock tube threadedly connected to the focusing ring so that rotation of the latter will non-rotatably move said tube axially of said mount, a lens barrel telescopically positioned in said lock tube and axially slidable therein from an inoperative to an operative position, a bayonet lock connection for releasably engaging said barrel to said tube by a relative rotation so as to non-rotatable move axially as a unit therewith to focus said mount upon adjustment of said focusing ring, said ring being movable to and from a predetermined position of adjustment, a lever pivotally mounted on said lock tube, a lug carried by said lever, said ring being formed with a recess adapted to be positioned in registry with said lug when said mechanism is moved to said adjusted position and said barrel is disconnected from said lock tube, a spring operatively connected to said lever to hold said lug in said recess to lock said mechanism in said predetermined position, and a cam on said barrel arranged when said barrel is connected to said tube to rock said lever to move said lug out of said recess to free said ring so that the latter may be moved from said predetermined position.

12. In a lens mount, the combination with a focusing mechanism carried by said mount, of a lens barrel telescopically arranged within said mechanism and movable axially thereof to and from an operative relation therewith, means for releasably connecting said barrel to said mechanism when positioned in said operative relation, a pivoted lever carried by and movable with said mechanism and formed with parts arranged to separately and independently engage said barrel and said mechanism, means operative upon disengagement of said barrel from said mechanism for moving said lever to bring one of the parts thereof into locking engagement with said mechanism to lock the latter against adjustment, means for automatically and concomitantly moving said one part out of locking engagement with said mechanism and the other part into holding relation with said barrel when said barrel is connected to said mechanism, and means controlled by the movement of said mechanism after said barrel has been connected thereto for retaining said other part in holding relation with said barrel to lock said barrel against disengagement from said mechanism.

13. In a lens mount, the combination with a focusing mechanism carried by said mount, of a lens barrel telescopically arranged within said mechanism and movable axially thereof to and from an operative relation therewith, means for releasably connecting said barrel to said mechanism when positioned in said operative relation, a pivoted lever carried by and movable with said mechanism and formed with parts arranged to separately and independently engage said barrel and said mechanism, means operative upon the disengagement of said barrel from said mechanism for moving said lever to bring one of the parts thereof into locking engagement with said mechanism to lock the latter against adjustment, means on said barrel arranged to engage said other part when said barrel is connected to said mechanism to rock said lever to move said first part out of locking engagement with said mechanism, and means on said mechanism adapted to hold said other part in engagement with the engaging means on said barrel to lock the barrel to prevent the disengagement thereof from said mechanism.

14. In a lens mount, the combination with a focusing mechanism carried by said mount and movable to and from a predetermined position of adjustment, of a lens barrel telescopically arranged within said mechanism and movable axially thereof to and from an operative relation therewith, means for releasably connecting said barrel to said mechanism when positioned in said operative relation, a pivoted lever carried by and movable with said mechanism and formed with parts arranged to separately and independently engage said barrel and said mechanism, said mechanism being formed with recesses adapted to register with said parts when said mechanism is adjusted to said predetermined position, a spring operatively connected to said lever to rock the latter in one direction to move one of the parts thereof into one of said recesses to lock said mechanism in said predetermined position when said barrel is disconnected, means on said barrel and operative upon connecting said barrel to said mechanism to engage said other part to rock said lever in the opposite direction to move said one part out of said one recess to release said mechanism, a holding means on said barrel engaged by said other part when said one part is moved out of said one recess, said second recess being positioned in registry with said other part to permit the engagement thereof with said holding means, and a retaining portion on said mechanism movable into registry with said other part when said mechanism is moved from said predetermined position to hold said other part in engagement with said holding means to lock said barrel to said mechanism.

15. In a lens mount, the combination with a focusing mechanism carried by said mount, of a lens barrel telescopically arranged in said mount and adapted to be moved to and from an operative position and to be releasably connected to said mechanism when in said operative position, means carried by and movable with said mechanism and having a part adapted to engage said mechanism when the barrel is disconnected therefrom to lock the mechanism against adjustment, means on said barrel adapted to engage said last mentioned means when said barrel is connected to said mechanism to move said part out of locking engagement with said mechanism, a holding means on said barrel adapted to engage another part of said first mentioned means to retain said one part out of locking engagement with said mechanism, means on said mechanism operative upon adjustment of said mechanism from said predetermined position for retaining said other part in engagement with said holding means to lock said barrel to said mechanism and in said operative position, the return of said mechanism to said predetermined position permitting the disengagement of said barrel from said mechanism, and a spring operatively connected to said mechanism locking means for moving said first part into locking engagement with said mechanism upon the disengagement of said barrel therefrom.

16. In a lens mount, the combination with a focusing ring rotatably but non-axially movable on said mount, of a lock tube threadedly connected to said focusing ring so that rotation of the latter will non-rotatably move said lock tube axially of said mount, a lens barrel telescopically positioned in said lock tube and slidable axially therein to and from an operative position relative thereto, a bayonet lock connection for releasably engaging said barrel to said lock tube when said barrel is in said operative position so that said barrel may non-rotatably move axially as a unit with said lock tube upon rotation of said focusing ring, the latter being adjustable to and from a predetermined position, a lever pivotally mounted at its midpoint on said lock tube, a lug formed on each end of said lever, said ring being formed with a pair of recesses adapted to register with said lugs when said ring is moved to said predetermined position, a spring connected to said lever to rock the latter in one direction to move one of said lugs in to one of said recesses when said barrel is disconnected from said lock tube to lock said ring in said predetermined position, a cam on said lens barrel so arranged thereon that the connecting of said barrel to said lock tube serves to bring said cam into engagement with said other lug to rock said lever in the opposite direction to move said one lug out of said one recess to unlock said ring, said second recess being positioned in registry with the other lug to permit the rocking of said lever to unlock said ring, a shoulder on said barrel adjacent said cam and engageable by said other lug at the completion of the connecting of the barrel to the lock tube, and a blocking portion on said ring movable into registry with said other lug when said ring is moved from said predetermined position to retain the other lug in engagement with said shoulder to lock said barrel to said lock tube, the return of said ring to said position serving to again bring said recesses into registry with said lugs to permit the simultaneous disconnecting of the barrel from said lock tube and the locking of said ring by said one lug.

17. In a lens mount, the combination with a focusing mechanism carried by said mount, of a lens barrel telescopically and rotatably arranged in said mount and axially movable relative to said mechanism to and from an operative position therewith, means operative upon rotation of said barrel in said mechanism when said barrel is in said operative position to releasably connect said barrel to said mechanism so that adjustment of the latter will move said barrel for focusing, a locking member carried by said mount and independent of said connecting means and at no time engageable therewith, resilient means tending to urge said member into direct engagement with said focusing mechanism to lock the latter against adjustment, activating means on said barrel operative upon the disconnection of said barrel from said mechanism to permit said resilient means to become effective to move said locking member into direct locking engagement with said mechanism and also operative upon the connecting of said barrel with said mechanism to move said locking member out of locking engagement with said mechanism and into holding relation with said barrel, and means controlled by the adjustment of said mechanism for retaining said locking member in holding relation with said barrel to positively lock the latter in operative relation with said mechanism.

CARL F. NOWACK.
CHARLES M. LEE.